(12) United States Patent
Xu et al.

(10) Patent No.: US 7,925,157 B2
(45) Date of Patent: Apr. 12, 2011

(54) RANGING METHOD AND SYSTEM FOR PASSIVE OPTICAL NETWORK AND OPTICAL NETWORK UNIT THEREOF

(75) Inventors: Xiaogeng Xu, Shenzhen (CN); Chan Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 684 days.

(21) Appl. No.: 11/985,777

(22) Filed: Nov. 16, 2007

(65) Prior Publication Data

US 2008/0124075 A1  May 29, 2008

(30) Foreign Application Priority Data

Nov. 27, 2006 (CN) .......................... 2006 1 0157093

(51) Int. Cl.
*G02B 6/28* (2006.01)
*H04J 14/08* (2006.01)
*H04J 14/00* (2006.01)
*H04B 10/06* (2006.01)
*H04B 10/20* (2006.01)
*H04Q 11/02* (2006.01)
*H04L 12/66* (2006.01)

(52) U.S. Cl. ................ 398/25; 398/16; 398/66; 385/24; 385/14

(58) Field of Classification Search ............ 398/25
See application file for complete search history.

(56) References Cited

U.S. PATENT DOCUMENTS

| | | | |
|---|---|---|---|
| 5,621,895 A | 4/1997 | Weis et al. | |
| 5,907,417 A * | 5/1999 | Darcie et al. | 398/20 |
| 5,912,998 A * | 6/1999 | Quayle | 385/24 |
| 6,563,613 B1 | 5/2003 | Tochio | |
| 7,613,125 B2 * | 11/2009 | Fidler et al. | 370/249 |
| 2002/0163695 A1 * | 11/2002 | Unitt et al. | 359/137 |
| 2003/0048801 A1 * | 3/2003 | Sala et al. | 370/445 |
| 2003/0063843 A1 * | 4/2003 | Horne | 385/24 |
| 2003/0133460 A1 * | 7/2003 | Lee et al. | 370/395.43 |
| 2006/0133809 A1 * | 6/2006 | Chow et al. | 398/66 |
| 2006/0146855 A1 * | 7/2006 | Kani et al. | 370/430 |
| 2007/0133424 A1 * | 6/2007 | Brolin et al. | 370/249 |
| 2007/0154217 A1 * | 7/2007 | Kim et al. | 398/72 |
| 2007/0183793 A1 * | 8/2007 | Zhao et al. | 398/212 |
| 2007/0291735 A1 * | 12/2007 | Fidler et al. | 370/352 |
| 2008/0124075 A1 * | 5/2008 | Xu et al. | 398/25 |

FOREIGN PATENT DOCUMENTS

CA  2070296 A  * 12/1992

(Continued)

OTHER PUBLICATIONS

English Abstracts of CN 1099778 dated Jan. 22, 2003.

(Continued)

*Primary Examiner* — Ken N Vanderpuye
*Assistant Examiner* — Oommen Jacob

(57) ABSTRACT

A ranging method and system for passive optical network, and an optical network unit are provided. The ranging method includes: sending an initial ranging signal to a splitter loop-back device and recording a current sending time as a first time; receiving a loop-back ranging signal from the splitter loop-back device, and determining whether the loop-back ranging signal is a return signal of the initial ranging signal; if the loop-back ranging signal is a return signal of the initial ranging signal, recording a current receiving time as a second time; and obtaining ranging information by calculating a difference between the first time and the second time, and performing a ranging on the basis of the ranging information.

15 Claims, 3 Drawing Sheets

FOREIGN PATENT DOCUMENTS

| | | |
|---|---|---|
| CA | 2070296 | 5/1996 |
| CN | 1173251 A | 2/1998 |
| CN | 1099778 | 1/2003 |
| CN | 1592158 | 3/2005 |
| EP | 0 521 197 A1 | 1/1993 |
| EP | 0 585 087 | 3/1994 |
| EP | 1 330 077 | 7/2003 |
| WO | 96/16490 | 5/1996 |

OTHER PUBLICATIONS

English Abstracts of CN 1592158 dated Mar. 9, 2005.
English Translation of the Written Opinion of the International Search Authority in PCT/CN2007/001657.
Office Action of Jan. 22 in CN 2006/101570934 and translation thereof.
European Search Report in EP 07120402.
European Office Action of Feb. 4, 2009 in EP 07120402.
Series G. Transmission Systems and Media, Digital Systems and Networks, ITU-T Telecommunication Standardization Sector o ITU, G.984-6, Mar. 2008, pp. 1-33.
Part 3: Carrier sense multiple access with collision detection (CSMA/CD) access method and physical layer specifications, IEEE, Mar. 8, 2002, 1538 pages.
Supplementary European office action issued in corresponding European Patent Application No. 07120402.8; issued Jun. 15, 2010.
Office action issued in corresponding Chinese patent application No. 200610157093.4, dated Aug. 4, 2010; and partial English translation therein; total 12 pages.

\* cited by examiner

RANGING METHOD AND SYSTEM FOR PASSIVE OPTICAL NETWORK AND OPTICAL NETWORK UNIT THEREOF

This application claims the priority of Chinese patent application No. 200610157093.4 filed with the Chinese Patent Office on Nov. 27, 2006, titled "Ranging Method and System for Passive Optical Network", the entire content of which is incorporated herein by reference.

FIELD OF THE INVENTION

The present invention relates to the field of communications and transmission, and in particular to a ranging method and system for Passive Optical Network (PON), and an Optical Network Unit (ONU) thereof.

BACKGROUND OF THE INVENTION

With the development of optical devices and the relevant technology, the single-channel rate of the backbone network has been improved greatly. The development of the optical amplifier, dispersion compensation and optical fiber technologies makes the multiplexed wavelengths of Dense Wavelength Division Multiplexing even greater in quantity. The technical development in such two aspects enables the backbone network to gain a considerable progress in its capacity. People at the client side have increasing requirements for information. Users have requirements for even more bandwidth for online games, online movies, downloading from Internet, and Internet Protocol TV (IPTV) that will be available in the near future, which results in a problem of access bottleneck. For solving this problem, many solutions have been proposed such as asymmetrical digital subscriber line, very high rate digital subscriber line, Optical Access Network (OAN). The OAN is classified into active optical network and Passive Optical Network depending on the existence of active devices.

Among the access solutions in the prior art, the PON technology is the most attractive and widely used one with such unique advantages as: 1) PON completely adopts passive devices in its Optical Distribution Network (ODN) to reduce the number of communication stations; 2) PON is easy to be maintained and can be upgraded; and 3) optical transmission which has a high bandwidth is used for access to PON, which can satisfy the current and future demands for bandwidth.

In the prior art, a PON system has such a topological architecture as illustrated in FIG. 1. The PON includes three components: an Optical Line Terminal (OLT) 110, which is installed at a central control station; an Optical Distribution Network (ODN), and a plurality of ONUs 130 (ONU$_1$, ONU$_2$, ONU$_3$, ..., ONU$_N$, wherein N represents number of the ONUs in the PON), which are installed at the user site. The ODN may include an optical splitter 120 as illustrated in FIG. 1, and also optical fibers. The PON adopts a broadcast mode for the transmission in its downlink, with the downlink information sent from the OLT and received by all the ONUs, each of which extracts downlink information destined to it in accordance with a certain mechanism. In the uplink, the time division multiple access technology is adopted so that multiple ONUs share the uplink bandwidth.

Since the ONUs are physically located at different locations, data frames sent from each of them will arrive at the OLT simultaneously, which may result in transmission collision. To solve the problem, it is necessary to range each ONU so as to prevent the logical time when data frames from each ONU arrive at OLT from colliding with data frames from one another. When ranging an ONU, it is required to reserve for the ranged ONU a certain ranging period during which other ONUs cease sending uplink traffic in order to avoid collision. This period is referred to as ranging window. The OLT periodically sends a ranging grant signal, which carries local time. Upon receiving the grant signal, each ONU temporarily ceases sending uplink traffic. The prior ranging method, by taking the example of performing ranging on ONU1, includes the steps as follows:

1) ONU1 reads the time t1 in a grant signal and writes the time t1 into its local clock on receiving the grant signal sent from OLT.

2) ONU1 sends a response frame which carries its local time.

3) On receiving the response frame, from ONU1, which carries its local time, OLT calculates the difference between the carried time t2 and its local time of its local clock to get the RTT (Round Trip Time), based on which the ranging is performed.

The following issues are found in developing the present invention:

When performing ranging on the ONU, the windowing duration is necessary to cover the entire system and the transmission time corresponding to the distance from the optical splitter to the OLT. Consequently, one ONU has to be provided with a large data memory to avoid traffic loss due to the long ranging distance and the long ranging time. In addition, other ONUs may not transmit traffic respectively before the ranged ONU completes the ranging, which results in that a large quantity of bandwidth is occupied. Furthermore, it takes a plenty of time to perform the ranging which requires optical-to-electrical and electrical-to-optical conversions. Moreover, the standard maximum RTT is adopted as the ranging time, thereby introducing a long delay.

The processing time of ONU needs redefining when the system speeds up. The ranging method lacks robustness. It is required to redefine a balance time when the system distance exceeds the standard maximum distance. During the ranging, such processing steps as reading an OLT clock tag and writing into the ONU clock tag exist at the ONU side, which introduces a delay and makes the system more complex.

SUMMARY OF THE INVENTION

Embodiments of the present invention provide a ranging method and system for Passive Optical Network, as well as an Optical Network Unit. Such disadvantages as spending too much time on the ranging can be avoided.

A ranging method for Passive Optical Network according to an embodiment of the present invention includes:

A ranging method for passive optical network includes the steps of:

Sending an initial ranging signal to a splitter loop-back device and recording a current sending time as a first time;

Receiving a loop-back ranging signal from the splitter loop-back device, and determining whether the loop-back ranging signal is a return signal of the initial ranging signal; if the loop-back ranging signal is a return signal of the initial ranging signal, recording a current receiving time as a second time; and Obtaining ranging information by calculating a difference between the first time and the second time, and performing a ranging on the basis of the ranging information.

A ranging system for a passive optical network includes: a splitter loop-back device, and an optical network unit; wherein The splitter loop-back device is adapted for performing a loop-back on an initial ranging signal from the optical network unit into a loop-back ranging signal, and sending the loop-back ranging signal to the optical network unit;

The optical network unit is adapted for sending the initial ranging signal and recording a current sending time as a first time information; receiving the loop-back ranging signal sent by the splitter loop-back device, determining that the loop-back ranging signal is a return signal of the initial ranging signal, and recording a current receiving time as a second time; obtaining ranging information by calculating a difference between the first time and the second time, and performing a ranging on the basis of the ranging information.

An optical network unit includes:

a clock module for recording a first time at which an initial ranging signal is sent and a second time at which a loop-back ranging signal is sent;

a control module for sending the initial ranging signal, receiving the loop-back ranging signal, obtaining ranging information by calculating a difference between the first time and the second time recorded in the clock module upon a determination that the loop-back ranging signal is a return signal of the initial ranging signal, and performing a ranging on the basis of the ranging information.

As can be seen from the above technical solution of the present invention, in the embodiments of the present invention, by means of the ranging method which adopts the splitter loop-back device, optical signals are not processed by the OLT, thereby spending less time on ranging to save the effort to provide a large data buffer and significantly improves system performance. At the time of ranging, in the embodiments of the present invention, a re-ranging is unnecessary when performing switching for protection due to a failure occurring in the OLT and the splitter, therefore greatly reducing the switching time when a failure occurs from the splitter to the ONU, which accordingly improves robustness of the system. Meanwhile, the system according to the embodiments of the present invention exhibit good adaptability when being upgraded; therefore, the PON system covers an extended distance and operates at a higher speed, with changing neither system settings nor the ranging method.

DETAILED DESCRIPTION OF THE INVENTION

Figure 1:
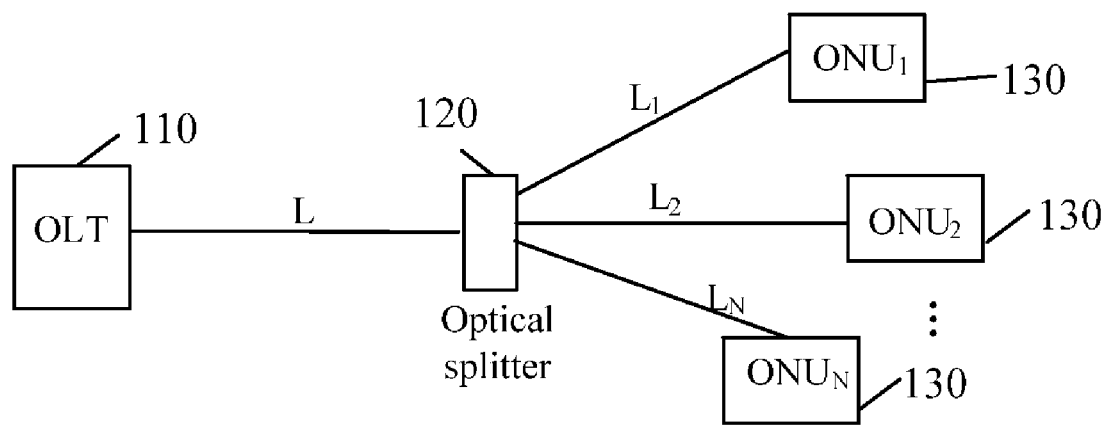
FIG. 1 is a schematic diagram illustrating the topological architecture of the PON system in the prior art.
Figure 2:
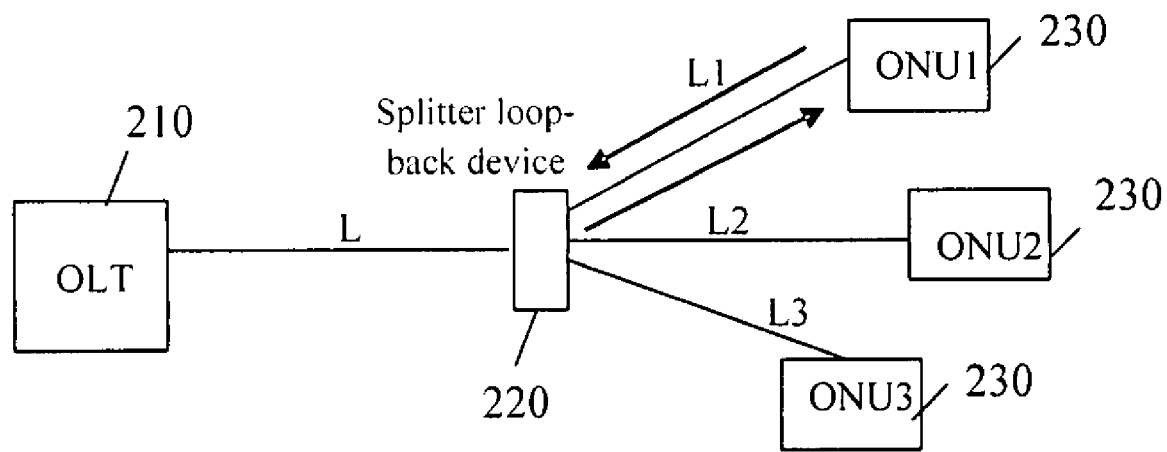
FIG. 2 is a schematic diagram illustrating the topological architecture of the PON system according to an embodiment of the present invention.

FIG. 2 is a schematic diagram illustrating the topological architecture of the PON system according to an embodiment of the present invention. Each of the plurality of ONUs 230, during a ranging, has to pass through the distance L which starts at an OLT 210 and ends at a splitter loop-back device 220, and which has no influence on the ranging time. Therefore, it is unnecessary to range the distance L during the ranging. In practice, it is preferable to place the splitter loop-back device 220 as close to the end users as possible. Therefore, the splitter loop-back device 220 which is located between the OLT 210 and the ONUs 230, is closer to the ONUs 230 than to the OLT 210, so that the optical fiber distance L is longer than the optical fiber distance of the access segment $L_i$ ($L_1$, $L_2$, $L_3$). For ensuring that each ONU has the same logical time and avoiding collision, the ranging is performed by means of a loop formed with the splitter loop-back device 220.

The technical solution of the present invention will be described as follows in detail with reference to two detailed embodiments.

The first embodiment of the present invention is a ranging method in which a signal of low frequency and low amplitude is carried in an initial ranging signal to identify an ONU. The method includes the following steps:

1) During the ranging, an ONU sends an initial ranging signal with a signal of low frequency and low amplitude to the splitter loop-back device, and records and stores the current time of the ONU as the first time, which is denoted as t1.

The initial ranging signal includes the ID information of the ONU, and identifies whether it is an initial ranging or re-ranging. In general, the ONU sends the initial ranging signal only after receiving a ranging grant signal sent by an OLT via the splitter loop-back device and confirms the grant. The ranging grant signal may include the ranging grant for all ONUs or for a certain ONU.

2) The splitter loop-back device receives the initial ranging signal with the signal of low frequency and low amplitude, performs loop-back processing on the initial ranging signal, and sends a resultant loop-back ranging signal to the ONU.

3) The ONU determines whether the ranging is successful upon receiving the loop-back ranging signal.

If the signal of low frequency and low amplitude carried in the initial ranging signal has the same frequency information as the signal of low frequency and low amplitude carried in the loop-back ranging signal does, which means that the loop-back ranging signal is a return signal of the initial ranging signal, i.e., the ranging is successful. The current time of ONU is recorded and stored as the second time, which is denoted as t2.

It should be noted that in the embodiment of the present invention other methods can be adopted to determine whether the loop-back ranging signal is a return signal of the initial ranging signal, for example, determining whether the initial ranging signal and the loop-back ranging signal have the same information element, or determining whether the power of the initial ranging signal is a sum of that of the loop-back ranging signal and a power loss to determine whether the loop-back ranging signal is a return signal of the initial ranging signal, thereby determining whether the ranging is successful.

If the initial ranging signal is an optical signal carrying frequency information, the process of determining whether the loop-back ranging signal is a return signal of the initial ranging signal may include: determining whether frequency information carried in the initial ranging signal is the same as that carried in the loop-back ranging signal, and if yes, determining that the loop-back ranging signal is a return signal of the initial ranging signal. The frequency information is loaded onto the optical signal, or added to the optical signal by changing the drive current of a laser.

If the loop-back ranging signal is not a return signal of the initial ranging signal, it indicates that the ranging is unsuccessful, the ONU performs a random delay adjustment and/or power adjustment on the initial ranging signal, and returns to step 1, i.e., resends a new initial ranging signal to the splitter loop-back device. If the ranging fails for many times or within a predetermined time period T, the situation should be reported to a network administrator or a fault indication administrator. In other words, if the ranging fails within predetermined times or within a predetermined time period T, the ONU notifies a network administrator or a fault indication administrator of the fault information.

4) RTT of the ONU is obtained by seeking the difference between t1 and t2, thereby calculating a delay adjustment time, i.e. the ranging information, on the basis of which the ranging is performed.

The second embodiment of the present invention is a ranging system for PON which includes an OLT, a splitter loop-back device and one or more ONUs.

The OLT is adapted for sending a ranging grant signal to the splitter loop-back device. The OLT sends downlink signals from an upper layer network, such as traffic source signals like telephone, video, data, etc. to the splitter loop-back device. The downlink signals are in turn sent to terminal users. And the OLT also generates a ranging grant signal and sends the ranging grant signal via a transmitting module to the splitter loop-back device, thereby completing such functions as related control processing and registration, administration, etc.

The splitter loop-back device is adapted for optically splitting the ranging grant signal and transmitting split ranging grant signals to the one or more ONUs, performing loop-back on signals from ONUs to get loop-back ranging signals. In the downlink direction, the splitter loop-back device optically splits and transmits downlink signals from OLT to each ONU. In the uplink direction, the splitter loop-back device transmits ONU's optical signals to OLT.

The ONUs, on receiving downlink signals sent by OLT, such as traffic source signals like telephone, video and data, forwards the downlink signals to the end client side (e.g. telephone, computer, TV, etc.), and sends client's signals received from the end client at client side to OLT. An ONU sends an initial ranging signal to the splitter loop-back device when performing the ranging. One ONU specifically includes a control module and a clock module. The clock module is adapted for recording the time t1 when an ONU sends an initial ranging signal. When arriving at the splitter loop-back device, the initial ranging signal may be subject to a loop-back device to become a loop-back ranging signal. The loop-back ranging signal will arrive at the ONU after transmitted via the optical fiber.

After the ONU receives the loop-back ranging signal, the control module parses the loop-back ranging signal received, and determines whether the loop-back ranging signal is a return signal of the initial ranging signal. If the loop-back ranging signal is a return signal of the initial ranging signal, the clock module will read the current time t2. The clock module will process the time t1 and t2 so as to obtain the ranging information, and notify the control module of the ranging information for ranging.

It can be understood that an Optical Network Unit (not illustrated) according to an embodiment of the present invention includes:

A clock module for recording a first time when sending an initial ranging signal and a second time when receiving a loop-back ranging signal; a controlling module for sending the initial ranging signal, receiving the loop-back ranging signal, determining that the loop-back ranging signal is a return signal of the initial ranging signal, obtaining ranging information by calculating the difference between the first time and the second time, both of which are recorded by the clock module, and performing ranging in accordance with the ranging information.

The Optical Network Unit may further include: a grant determining module, for receiving ranging grant signals and performing parsing, notifying the control module of sending the initial ranging signal to the splitter loop-back device upon determination of being granted.

The Optical Network Unit may further include an adjusting module. The control module, after determining that the loop-back ranging signal is not a return signal of the initial ranging signal, delivers a notification to the adjusting module. The adjusting module is adapted for performing a random delay adjustment and/or a random power adjustment on the initial ranging signal in accordance with the received notification, and notifying the control module to resend a new initial ranging signal.

Figure 3:
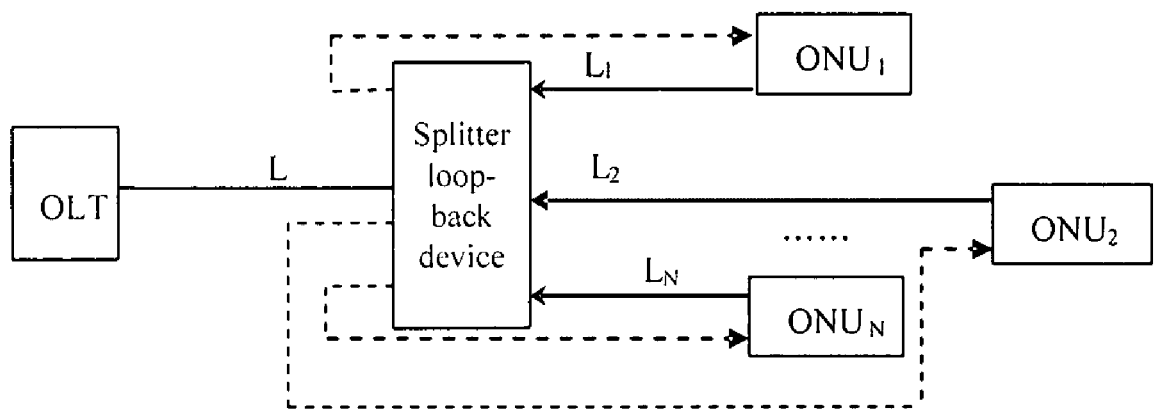
FIG. 3 is a block diagram illustrating the splitter loop-back module of the splitter loop-back device according to an embodiment of the present invention.

FIG. 3 illustrates a splitter loop-back module of a splitter loop-back device according to an embodiment of the present invention. The splitter loop-back device functions to perform optical splitting and loop-back on signals. In the downlink direction, the splitter loop-back device distributes downlink signals sent by the OLT to each sub-path leading to each ONU, which receives the downlink signals. In the uplink direction, when the initial ranging signal is sent, the splitter loop-back device performs loop-back on the ranging signal. Each ONU perform a ranging function. When sending uplink traffic, an ONU receives only downlink signals without receiving loop-back optical signals. As may be understood from the above first embodiment that the loop-back ranging signal and the initial ranging signal carry the same frequency information, it is therefore easy for ONU to distinguish whether a received signal is a loop-back ranging signal or a downlink traffic signal, thereby preventing a loop-back light from affecting the downlink signals.

Some parts in FIG. 3 are depicted in dashed lines to demonstrate that the splitter loop-back device may achieve the function of loop-back, in which the loop-back part may perform a loop-back via the same path or via different paths. In an embodiment of the present invention, the splitter loop-back device may implement the optical splitting and loop-back of signals with combined devices or with individual devices. Specifically, the splitter loop-back device according to an embodiment of the present invention can be any one of: an (N+1)×(N+1) coupler, a combined device of a splitter and a fiber grating, a combined device of a 2×N coupler and a reflection film, and a combined device of a 2×N coupler and a fiber grating, wherein N is the number of the ONUs in the PON. The detailed solution of the respective splitter loop-back device are described as follows:

Solution 1: Solution of (N+1)×(N+1) coupler, which is a solution that functions by the characteristics of the (N+1)×(N+1) coupler. In the downlink direction, a light beam emitted by OLT is split into (N+1) light beams with one of the beams terminated, thereby achieving the function of optical splitting. In the uplink direction, the ONU and the (N+1)×(N+1) coupler may complete a loop-back so as to perform ranging on the ONU by means of this loop-back mechanism.

Solution 2: Solution of a combined device of a splitter and a fiber grating. In the downlink direction, a light beam with a certain wavelength is split into N beams, and the N beams are received by ONUs. In the uplink direction, when arriving at the splitter and reflection device, a light with another certain wavelength is reflected to each ONU, thereby forming a loop-back mechanism.

Solution 3: Solution of a combined device of a 2×N coupler and a reflection film (wherein the coupler are not limited to the 2×N mode). In the downlink direction, optical signals emitted by OLT are split by the splitter into N beams, and the N beams are received by ONUs. In the uplink direction, when optical signals emitted by an ONU arrives at the coupler, a part of the optical signals pass through the coupler while other parts are reflected at an end of the coupler and arrive at the ONUs, thereby completing an ONU's loop-back.

Solution 4: Solution of a combined device of a 2×N coupler and a fiber grating (wherein the coupler is not limited to the 2×N mode). In the downlink direction, an optical signal emitted by OLT is split by the combined device into N beams, and the N beams are received by ONUs. In the uplink direction, optical signals with a certain wavelength are output at the splitter and reflected by the fiber grating, thus forming a loop-back.

According to the above description, an embodiment of the present invention provides a ranging method by using a splitter loop-back device. An optical splitter in a PON according to the prior art is replaced with a splitter loop-back device, so that a loop-back mechanism is formed between the splitter and each ONU. The splitter loop-back device has functions of both optical splitting and loop-back. Optical signals are not processed by OLT, thereby reducing less time on ranging and saving the effort to provide a large data buffer and significantly improving system performance. In comparison with the prior art, at the time of ranging, in an embodiment of the present invention, a re-ranging is unnecessary when performing switching for protection due to failures occurred in OLT and the splitter; and can significantly reduce the switching time when failure occurs from the splitter to ONU, which accordingly improves robustness of the system. Also, a system according to an embodiment of the present invention exhibits good adaptability when being upgraded, thus may change neither system settings nor ranging method when PON system extends its distance and speeds up.

The above descriptions are only for preferred embodiments of the present invention and are not for use in limiting the protection scope of the present invention. Those skilled in the art can make modifications or substitutions that are easily conceived within the technical scope disclosed by the present invention. The modifications or substitutions should fall into the protection scope of the present invention. Therefore, the protection scope of the present invention should therefore be defined in the appended claims.

What is claimed is:

1. A ranging method for use by an optical network unit (ONU) in a ranging system of a passive optical network that comprises the ONU and a splitter loop-back device, comprising:
    sending, by the ONU, an initial ranging signal to the splitter loop-back device and recording a current sending time as a first time;
    receiving, by the ONU, a loop-back ranging signal from the splitter loop-back device, and
    determining, by the ONU, whether the loop-back ranging signal is a return signal of the initial ranging signal;
    if the loop-back ranging signal is a return signal of the initial ranging signal, recording, by the ONU, a current receiving time of the loop-back ranging signal as a second time;
    obtaining, by the ONU, ranging information by calculating a difference between the first time and the second time; and
    performing, by the ONU, a ranging on the basis of the ranging information.

2. The method according to claim 1, wherein the determining whether the loop-back ranging signal is a return signal of the initial ranging signal comprises:
    determining whether the initial ranging signal and the loop-back ranging signal have a same cell;
    wherein if the initial ranging signal and the loop-back ranging signal have the same cell, the loop-back ranging signal is a return signal of the initial ranging signal.

3. The method according to claim 1, wherein the determining whether the loop-back ranging signal is a return signal of the initial ranging signal comprises:
    determining whether a power of the initial ranging signal is a sum of a power of the loop-back ranging signal and a power loss;
    wherein if the power of the initial ranging signal is a sum of the power of the loop-back ranging signal and the power loss, the loop-back ranging signal is a return signal of the initial ranging signal.

4. The method according to claim 1, wherein the initial ranging signal includes a low frequency and low amplitude signal therein; and the determining whether the loop-back ranging signal is a return signal of the initial ranging signal comprises:
    determining whether the loop-back ranging signal includes a low frequency and low amplitude signal;
    wherein the loop-back ranging signal is a return signal of the initial ranging signal if the loop-back ranging signal includes a low frequency and low amplitude signal.

5. The method according to claim 1, wherein the initial ranging signal is an optical signal carrying frequency information; and the determining whether the loop-back ranging signal is a return signal of the initial ranging signal comprises:
    determining whether the initial ranging signal and the loop-back ranging signal carry same frequency information;
    wherein the loop-back ranging signal is a return signal of the initial ranging signal if the initial ranging signal and the loop-back ranging signal carry the same frequency information.

6. The method according to claim 5, wherein the frequency information is loaded onto the optical signal or added to the optical signal by changing a drive current of a laser.

7. The method according to claim 1, further comprising:
    if the loop-back ranging signal is not a return signal of the initial ranging signal, performing a random delay adjustment, a power adjustment, or both, on the initial ranging signal to generate a new initial ranging signal; and
    sending the new initial ranging signal to the splitter loop-back device.

8. The method according to claim 7, further comprising:
    reporting fault information if the ranging fails for predetermined times or within a predetermined time period T.

9. The method according to claim 1, further comprising:
    before sending the initial ranging signal to the splitter loop-back device, receiving a ranging grant signal from an optical line terminal, and
    parsing the ranging grant signal to determine whether a range has been granted.

10. A ranging system for a passive optical network, comprising: a splitter loop-back device, and an optical network unit;
    wherein
    the splitter loop-back device is configured to perform a loop-back operation which generates a loop-back ranging signal based on an initial ranging signal received from the optical network unit, and send the loop-back ranging signal to the optical network unit;
    the optical network unit is configured to send the initial ranging signal and record a current sending time as a first time; receive the loop-back ranging signal from the splitter loop-back device, determine whether the loop-back ranging signal is a return signal of the initial ranging signal, and record a current receiving time as a second time; and, if the loop-back ranging signal is the return signal of the initial ranging signal, obtain ranging information by calculating a difference between the first time and the second time, and perform a ranging on the basis of the ranging information.

11. The ranging system according to claim 10, further comprising:
   an optical line terminal, configured to send a ranging grant signal to the splitter loop-back device;
   wherein the splitter loop-back device is further configured to perform an optical splitting to the ranging grant signal and send one of the split ranging grant signals to the optical network unit;
   and the optical network unit is further configured to parse the split ranging grant signal, and send the initial ranging signal to the splitter loop-back device if it is determined that a range has been granted.

12. The ranging system according to claim 10, wherein the splitter loop-back device is one of the following:
   an $(N+1) \times (N+1)$ coupler,
   a combined device of a splitter and a fiber grating,
   a combined device of a $2 \times N$ coupler and a fiber grating, and
   a combined device of a $2 \times N$ coupler and a reflection film,
   wherein N is the number of the optical network unit in the ranging system.

13. An optical network unit, which is in communication with a splitter loop-back device, the optical network unit comprising:
   a clocking unit, configured to record a first time at which an initial ranging signal is sent to the splitter loop-back device, and a second time at which a loop-back ranging signal is received from the splitter loop-back device;
   a controlling unit, configured to send the initial ranging signal, receive the loop-back ranging signal, obtain ranging information by calculating a difference between the first time and the second time recorded in the clocking unit if it is determined that the loop-back ranging signal is a return signal of the initial ranging signal, and perform a ranging on the basis of the ranging information.

14. The optical network unit according to claim 13, wherein the controlling unit is further configured to:
   receive and parse a ranging grant signal, and send the initial ranging signal to the splitter loop-back device if it is determined that a range has been granted.

15. The optical network unit according to claim 13, wherein the controlling unit is further configured to:
   if it is determined that the loop-back ranging signal is not a return signal of the initial ranging signal, perform a random delay adjustment, a power adjustment, or both, on the initial ranging signal to generate a new initial ranging signal, and send the new initial ranging signal to the splitter loop-back device.

\* \* \* \* \*